United States Patent
Kriegmair

(10) Patent No.: US 10,265,804 B2
(45) Date of Patent: Apr. 23, 2019

(54) PROCESS AND SYSTEM FOR PRODUCING HOLES IN TURBINE AND OTHER COMPONENTS

(71) Applicant: Josef Kriegmair, Langenpreising (DE)

(72) Inventor: Josef Kriegmair, Langenpreising (DE)

(73) Assignee: MTU AERO ENGINES GMBH, Munich (DE)

( * ) Notice: Subject to any disclaimer, the term of this patent is extended or adjusted under 35 U.S.C. 154(b) by 0 days.

(21) Appl. No.: 14/632,626

(22) Filed: Feb. 26, 2015

(65) Prior Publication Data

US 2016/0074969 A1 Mar. 17, 2016

Related U.S. Application Data

(63) Continuation of application No. 12/040,384, filed on Feb. 29, 2008, now abandoned, which is a
(Continued)

(30) Foreign Application Priority Data

Sep. 6, 2005 (DE) .......... 10 2005 042 270

(51) Int. Cl.
*B23K 26/382* (2014.01)
*F01D 5/18* (2006.01)
(Continued)

(52) U.S. Cl.
CPC .......... *B23K 26/388* (2013.01); *B23K 26/384* (2015.10); *B23K 26/389* (2015.10);
(Continued)

(58) Field of Classification Search
CPC .. B23K 26/383; B23K 26/388; B23K 26/389; B23K 26/384; Y10T 408/03;
(Continued)

(56) References Cited

U.S. PATENT DOCUMENTS

| | | | | |
|---|---|---|---|---|
| 4,725,705 A | * | 2/1988 | Holland-Moritz et al. | ................. 219/69.17 |
| 5,559,334 A | * | 9/1996 | Gupta | ................. G01C 11/02 250/358.1 |

(Continued)

FOREIGN PATENT DOCUMENTS

| | | | |
|---|---|---|---|
| DE | 10335657 | | 2/2005 |
| EP | 1510283 | * | 3/2005 |
| GB | 2345455 A | | 7/2000 |

OTHER PUBLICATIONS

International Search Report corresponding to International application No. PCT/DE2006/0001497, completed Dec. 4, 2006.

*Primary Examiner* — Brian W Wathen
*Assistant Examiner* — Olvin Lopez Alvarez
(74) *Attorney, Agent, or Firm* — McAndrews, Held & Malloy, Ltd.

(57) ABSTRACT

A method of producing holes in a component, in particular of turbomachines, wherein each hole extends from a first, outer surface to a second, inner surface of the component and wherein the method has, for example, the following steps: (i) producing a 3D model of the actual geometry of the component, at least for the region of the holes; (ii) adapting each hole on the basis of the actual geometry of the component; and (iii) generating a production program for each individual hole. In this way, the process quality and with it the quality of the holes increases, because the offset of holes caused by component tolerances is avoided and the drilling funnels are formed according to specification. Furthermore, drilling defects on account of the offset of holes and/or cores can be avoided. Overlapping holes caused by component tolerances are likewise avoided.

32 Claims, 2 Drawing Sheets

Related U.S. Application Data continuation of application No. PCT/DE2006/001497, filed on Aug. 26, 2006.

(51) Int. Cl.
*G05B 19/4099* (2006.01)
*B23K 26/388* (2014.01)
*B23K 26/384* (2014.01)
*G05B 19/402* (2006.01)

(52) U.S. Cl.
CPC ....... *G05B 19/402* (2013.01); *G05B 19/4099* (2013.01); *B23P 2700/06* (2013.01); *Y10T 408/03* (2015.01); *Y10T 408/08* (2015.01)

(58) Field of Classification Search
CPC . Y10T 408/08; Y10T 408/06; G05B 19/4099; G05B 2219/35134; G05B 2219/45139; G05B 19/402; F01D 5/186; F05D 2220/30; F05D 2230/13; F05D 2260/202; B23P 2700/06
USPC .................................. 700/159, 182
See application file for complete search history.

(56) References Cited

U.S. PATENT DOCUMENTS

| | | | | |
|---|---|---|---|---|
| 5,848,115 | A * | 12/1998 | Little et al. ........................ | 378/4 |
| 5,898,590 | A * | 4/1999 | Wampler ............. | G05B 19/401 |
| | | | | 33/504 |
| 6,307,175 | B1 * | 10/2001 | Blochlinger ......... | B23K 26/388 |
| | | | | 219/121.71 |
| 6,380,512 | B1 * | 4/2002 | Emer ....................... | 219/121.71 |
| 6,661,930 | B1 * | 12/2003 | Graham et al. ............... | 382/276 |
| 6,723,951 | B1 * | 4/2004 | McGraw ................... | 219/121.71 |
| 6,744,010 | B1 * | 6/2004 | Pepe .................... | B23K 26/384 |
| | | | | 219/121.66 |
| 7,013,246 | B1 * | 3/2006 | Gerlovin ................ | G06F 17/50 |
| | | | | 345/419 |
| 7,198,404 | B2 * | 4/2007 | Navab ................... | A61B 6/5247 |
| | | | | 378/206 |
| 7,329,832 | B2 * | 2/2008 | Hoebel et al. ........... | 219/121.71 |
| 7,411,150 | B2 * | 8/2008 | Lavers et al. ............ | 219/121.71 |
| 8,422,624 | B2 * | 4/2013 | Christoph .............. | G01B 15/00 |
| | | | | 378/4 |
| 8,548,619 | B2 * | 10/2013 | Richey ................. | G05B 19/401 |
| | | | | 700/98 |
| 2002/0153500 | A1 * | 10/2002 | Fordahl ................ | B23K 26/048 |
| | | | | 250/559.29 |
| 2003/0044248 | A1 * | 3/2003 | Nishii ..................... | B23B 35/00 |
| | | | | 408/1 R |
| 2003/0105538 | A1 * | 6/2003 | Wooten ............. | G05B 19/4099 |
| | | | | 700/90 |
| 2003/0112447 | A1 * | 6/2003 | Harding ................. | G01B 11/25 |
| | | | | 356/603 |
| 2004/0234025 | A1 * | 11/2004 | Schroeder ............. | A61B 6/032 |
| | | | | 378/20 |
| 2005/0105693 | A1 * | 5/2005 | Zhao ..................... | G06T 11/006 |
| | | | | 378/210 |
| 2005/0159840 | A1 * | 7/2005 | Lin et al. ...................... | 700/245 |
| 2005/0201611 | A1 * | 9/2005 | Lloyd, Jr. ............... | F01D 5/141 |
| | | | | 382/152 |
| 2006/0086700 | A1 * | 4/2006 | Callies ................ | B23K 26/123 |
| | | | | 219/121.59 |
| 2006/0229759 | A1 * | 10/2006 | Luketic et al. .............. | 700/166 |
| 2007/0217672 | A1 | 9/2007 | Shannon | |
| 2007/0276629 | A1 * | 11/2007 | Koonankeil ............ | F01D 5/005 |
| | | | | 702/185 |
| 2008/0250659 | A1 * | 10/2008 | Bellerose .............. | G05B 19/402 |
| | | | | 33/1 MP |
| 2009/0220349 | A1 * | 9/2009 | Bolms .................... | F01D 5/005 |
| | | | | 416/97 R |
| 2009/0248355 | A1 * | 10/2009 | Kriegmair ............. | B23K 26/60 |
| | | | | 702/155 |
| 2011/0019797 | A1 * | 1/2011 | Morton ................ | G01N 23/046 |
| | | | | 378/57 |

\* cited by examiner

PROCESS AND SYSTEM FOR PRODUCING HOLES IN TURBINE AND OTHER COMPONENTS

RELATED APPLICATIONS

This application is a continuation of U.S. application Ser. No. 12/040,384, filed Feb. 29, 2008, which is a continuation of International Application No. PCT/DE/2006/001497 (International Publication No. WO 2007/028355), having an International filing date of Aug. 26, 2006. International Application No. PCT/DE/2006/001497 claims priority to and benefit from German Patent Application No. 10 2005 042 270.5, filed Sep. 6, 2005. International Application No. PCT/DE/2006/001497 is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present technology relates generally to a process for producing holes in a component, in particular in a turbo engine, wherein each hole extends from a first surface at the exterior of the component to a second surface at the interior of the component. Furthermore, a production arrangement for carrying out the process is specified.

EP 1 246 711 131 describes, for example, such a process for producing an aperture, formed as a hole for cool air, in a metallic component of a gas turbine, where in that component the aperture comprises, at least in certain portions, a funnel which is formed so as to be non-cylindrical, extends from a first surface to a second surface of the component, and is formed with a laser beam.

Cool air holes have a close spacing, in the case of new types of components they may go into the component at different angles, and, in part, closely follow the wall geometry. Tolerances of the outer geometry, e.g. in blade profiles, and of the inner geometry, e.g. in cavities or cores, as well as the inconsistency between them make process-stable production of such cool air holes difficult. Furthermore, process-stable production is made difficult because the tolerances of the outer surface cause shifting, twisting, or tilting of the component, which has an effect on the position and shape of the cool air holes.

According to the known state of the art, the cool air holes are produced on the basis of the nominal geometry. The tolerances which are entailed in the clamping process are eliminated in part by measuring the component, which is usually done with tactile sensing devices. In so doing, the tolerances of the outer and inner geometries, such as cavities and cores, have previously not been taken into consideration.

In regard to position and shape, great demands are made on cool air holes, in particular on funnel-shaped holes, in order to achieve the specified cooling power for the component. If, for example, the cool air holes are too small due to an inadequately formed funnel, then such an outcome can lead to an impermissible overheating of the component and to its ultimate failure. This in turn can cause a breakdown of the entire turbo system. This applies to producing new parts as well as to maintenance, repair, and overhaul (MRO).

BRIEF SUMMARY OF THE INVENTION

Thus, one aspect of the presently described technology is to improve upon the process stated in the background. In particular, a process is provided in which one avoids inadequately formed funnel geometries at the outer surface, incompletely drilled holes, misalignment of the exit apertures of the holes, drilling through the walls of the inner geometry, and the merging of holes due to the component tolerances, which can be very large in comparison to the dimensions of the cool air holes, themselves. These unpredicted outcomes and unexpected advantages can be realized according to the present technology by a process with the features of the description contained herein and the appended claims, for example, claim 1 and a production arrangement with the features of claim 10. Advantageous extensions of the present technology are specified in the subordinate claims.

Through the specified realization the quality of processing, and with it the quality of the holes, increases because the misalignment caused by the component tolerances is avoided and the drilled funnels are formed according to the desired and/or selected specification. Furthermore, drilling through the walls of the inner geometry due to the misalignment of the holes and/or the cores is avoided. Merging holes caused by component tolerances are also avoided. This allows one skilled in the art to appreciate an increase of the service lifetime of the component. Reprocessing costs and reject costs are eliminated or reduced as well. Only raw parts which lie within specification reach the processing stage. The expense in the final control is reduced due to the high process-stability after the testing for the holes.

These and other features and advantages of the presently described technology will be further understood and appreciated by those skilled in the art by reference to the following description, claims and appended drawings, if any. A more detailed description of the present technology shall be discussed further below.

DETAILED DESCRIPTION OF THE INVENTION

Figure 1:
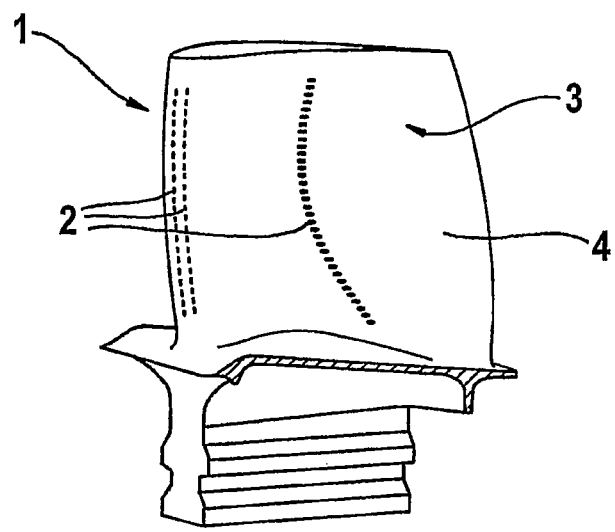
FIG. 1 is a perspective representation of a turbine blade of a gas turbine with apertures formed as cool air holes.

According to the presently described technology, a process for producing holes in a component, in particular of turbo engines, where each hole extends from a first surface at the exterior of the component to a second surface at the interior of the component, comprises the following steps:
  developing a 3-D model of the geometry of the component, at least for the area of the holes;
  adapting each hole on the basis of, the actual geometry of the component; and/or
  generating a production program for each individual hole.

The production of cool air holes requires that the outer and inner geometries (cavities in the turbine blade) of the individual part are known. This is provided via a 3-D model of the individual component. A 3-D model can be a surface model or a volume model. A 3-D model can be developed via computer tomography (CT) but other processes are also conceivable. If the precision of the CT for the outer geometry is inadequate, then it is generated via an optical measurement process. CT and data from the optical process are linked to the 3-D model. In so doing, it is also sufficient to transfer into the 3-D model only the extracts which are necessary for producing holes in the individual component and its orientation (for example, 6-point nest).

On the basis of the 3-D model of the individual component, each hole is adapted to the actual geometry within defined limits, where these limits can be the tolerances, (e.g., position, diameter, length of the cylinder, depth of the funnel, width of the funnel, length of the funnel, angle of the funnel) by shifting the pattern of holes or the individual hole or group of holes, tilting the hole, displacing the hole, adapting the diameter, shifting the diffuser in the axis of the hole, tilting the diffuser with axis of the hole, or adapting the angle of the diffuser.

In this way, one can avoid the misalignment of the exit of the hole due to the tolerance of the outer geometry (for example, air foil), whereby the covering of the component with the cooling film remains unaffected. Furthermore, a funnel shape according to specification is achieved despite the tolerance of the outer geometry, which has an effect on the funnel shape. Furthermore, drilling through the walls of the inner geometry due to tolerances of the inner geometry (cavity or core or core misalignment) can be avoided. Furthermore, merging holes or an undershoot of minimum spacings due to the tolerances of the raw part can also be avoided. One eliminates, or reduces the effect on the position and shape of the cool air holes which is due to the component's shifting, twisting, or tilting with respect to its nominal position, said shifting, twisting, or tilting being due to the tolerances of the outer surfaces on which the bases are formed (application point, 6-point nest). Furthermore, there is the possibility of producing holes at short distance of the other geometry. Due to the knowledge of the actual geometry, the system for producing holes can be controlled so that before a shot through/breakthrough into the interior space occurs, the power for the production process is reduced. This avoids drilling through the other geometry. If the drilling process is stable, then the actual drilling depth can be calculated. If the process is insufficiently stable, then an in-process measurement of the drilling depth is made. In this way, process-stable production of holes becomes possible, which is not possible, or not possible in a process-stable production manner, i.e., in the case of prior-art processes, due to the low back-feeding (laser drilling) or too small a distance to the adjacent contour (erosion, electrochemical drilling). This is useful in particular in the case of small blades of helicopter engines or engines of business jets since there the tolerances are higher in relation to the dimensions of the component than in the case of larger blades. Finally, the possibility is provided of introducing holes into a component already partially provided with holes (for example, in the case of MRP tasks) in a manner which is adapted to the holes which are already present.

After the adaptation, the production programs are generated with traversing motions, removal volumes, and process parameters (feed rate, power, etc.) for the drilling processes for each individual hole of the respective component. These parameters can be ensured by testing. This makes possible the options that storing the production programs for each individual component can be dispensed with, or that only storing of transformation matrices and the process parameters per component is necessary.

A deviation in position of each individual component in the clamping device, said deviation being caused by systematic errors of the clamping device, is advantageously corrected numerically. The variation in the clamping process, in so far as necessary, can also be determined via a measurement and corrected numerically. The component is defined in the machine producing the holes, except for the uncertainty of the measurement, which with the correct choice of the means of measurement and the process parameters is negligible.

Via a comparison between the nominal 3-D model of the component and the 3-D model with the actual geometry of the individual component, it is determined whether adaptations are necessary. This step, however, can also be dispensed with if no changes are necessary.

Furthermore, a production arrangement according to the presently described technology for producing holes in a component, in particular of turbo engines, e.g. a hole-producing system, where each hole extends from a first surface at the exterior of the component to a second surface at the interior of the component, is characterized by the fact that the arrangement comprises a central computer unit which is connected to a device for developing a 3-D model of the actual geometry of the component. Furthermore, the production arrangement comprises devices for automatically adapting the hole on the basis of the actual geometry of the component and devices for automatically generating production programs for each individual hole. With this arrangement, the process of the present technology can be carried out.

Advantageously, the central computer unit is connected to a device for automatically correcting the deviation of the component's position in the clamping device.

Furthermore, an advantageous extension of the production arrangement according to the present technology is characterized by an automatic drilling tool that is connected to the computer unit. The drilling tool can be provided for cutting, for electrochemical removal, or for erosion.

Additional measures improving the present technology are represented in more detail below together with the description of a preferred embodiment example of the present technology with the aid of the figures.

Figure 2:
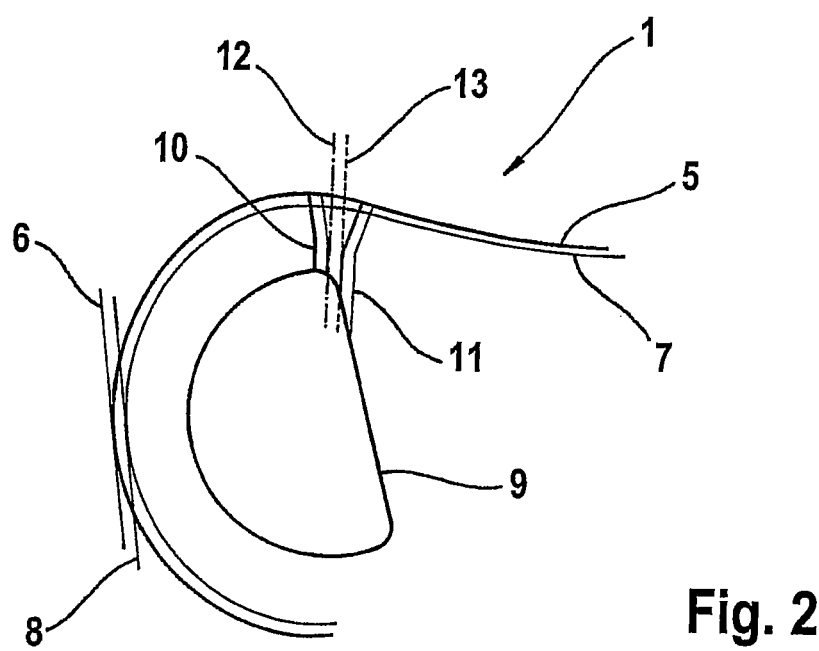
FIG. 2 is a first extract from a component of the present technology in a schematic cross-sectional view.
Figure 3:
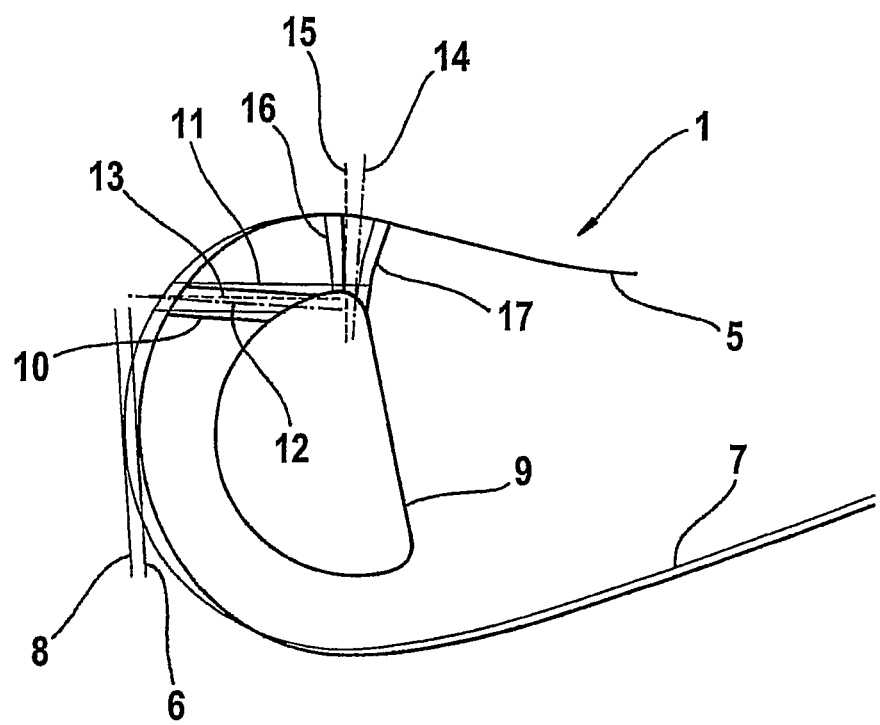
FIG. 3 is a second extract of a component of the present technology in a schematic cross-sectional view.

Refer now to FIGS. 1-3. The figures are schematic representations and serve to explain the present technology. The same and similar components are represented by the same reference numbers. The specifications of directions relate to the turbo engine, unless otherwise specified.

FIG. 1 shows, in perspective representation and as a component, a turbine blade 1 of a gas turbine, such as, for example, an aircraft engine, in which numerous apertures 2 are formed as cool air holes having been formed according to the process according to the present technology. The cool air holes 2 run in general through the component wall 3 at an acute angle, which usually lies in the range of 12° to 35° with respect to the outer surface 4 of the component 1 and, for example, is 30°. From a cavity in the turbine blade 1, air from the compressor is conducted through the cool air holes 2 in order to conduct a film of cool air over the outer surface 4 of the turbine blade 1.

The turbine blade 1 consists of a metal, such as, for example, an Ni-based or Co-based alloy, but can also consist of a ceramic material and another heat-resistant material, and for the production of cool air holes 2 is clamped in a processing machine in which it can be traversed or turned along several axes. The relative motion between a drilling tool with which the forming of the cool air holes 2 is done and the component 1 to be processed is in general produced by moving the component 1. Likewise, this can be achieved, in general, by a more limited motion of the drilling tool or a superimposed motion.

FIG. 2 shows an extract from component 1 in a schematic cross-sectional view. Therein the actual geometry of the outer surface 7 is represented with a thin line width and the nominal geometry of the outer surface with a thick line width. In this way, the actual basis for the production 8 and the nominal basis for the production 6 are defined. Furthermore, an inner surface 9 is represented, which in the present embodiment example bounds a cooling duct reaching through to the rotor.

Depending on the choice of the production basis, nominal basis or actual basis 8, either a hole 11 on the actual basis or a hole 10 on the nominal basis, with corresponding hole axes 13, 12, is generated. By the choice of the actual basis, drilling through the rear wall of the inner surface 9 is avoided.

FIG. 3 shows a second extract from component 1 in a schematic cross-sectional view, said component corresponding in essence to the component represented in FIG. 2. In contradistinction thereto, the component in FIG. 3 comprises a second hole 16, 17, which comprises either a hole axis 15 based on the actual basis or a hole axis 14 based on the nominal basis. By the choice of the actual basis, drilling through the rear wall and merging of holes is avoided.

With the production process according to the present technology, a hole on the actual basis is generated. In this way, one eliminates the effect on the position and shape of the cool air holes which is due to shifting, twisting, or tilting of the component with respect to its nominal position, said shifting, twisting, or tilting being due to the tolerances of the outer surfaces on which the bases are formed (application point, 6-point nest). In addition, merging holes and drilling through the rear wall caused by tolerances, by outer and inner geometry, and the shifting and tilting of the inner and outer geometry are avoided.

The invention has now been described in such full, clear, concise and exact terms as to enable any person skilled in the art to which it pertains, to practice the same. It is to be understood that the foregoing describes preferred embodiments and examples of the invention and that modifications may be made therein without departing from the spirit or scope of the invention as set forth in the claims. Moreover, while particular elements, embodiments and applications of the present technology have been shown and described, it will be understood, of course, that the present technology is not limited thereto since modifications can be made by those skilled in the art without departing from the scope of the present disclosure, particularly in light of the foregoing teachings and appended claims. Moreover, it is also understood that the embodiments shown in the drawings, if any, and as described above are merely for illustrative purposes and not intended to limit the scope of the invention, which is defined by the following claims as interpreted according to the principles of patent law, including the Doctrine of Equivalents. Further, all references cited herein are incorporated in their entirety.

The invention claimed is:

1. A process for producing a plurality of holes in a component, wherein each hole extends from a first surface at an exterior of the component to a second surface at an interior of the component, the process comprising the steps of:

clamping the component in a machine used for producing the plurality of holes in the component;

while the component is clamped in the machine, developing a 3-D model using computer tomography of a 3-D geometry of the component before producing the plurality of holes in the component;

improving the 3-D model by using an optical measurement process in addition to the computer tomography to form an improved 3-D model before producing the plurality of holes in the component;

adapting specifications for the plurality of holes based on a nominal 3-D model of the component on the basis of the improved 3-D model of the component to form a plurality of adapted hole specifications, wherein the plurality of adapted hole specifications comprises at least one of a tilted hole center axis angle or a shifted position of a hole center axis on the first surface of the component; and generating a production program used for forming the plurality of holes in the component corresponding to the plurality of adapted hole specifications.

2. The process according to claim 1, wherein the 3-D geometry of the component is the actual geometry.

3. The process according to claim 2, wherein the component is a turbo engine.

4. The process according to claim 2, wherein the 3-D model of the 3-D geometry is developed for the area of the holes.

5. The process according to claim 4, further comprising the step of measuring the drilling depth of at least one hole.

6. The process according to claim 5, wherein the step of generating a production program further comprises the step of developing and storing process parameters and at least one transformation matrix.

7. The process according to claim 5, wherein the holes are generated by at least one of cutting, laser removal, electrochemical processing, or erosion.

8. The process according to claim 1, further comprising the step of correcting a deviation of a position of the component in a clamping device.

9. The process according to claim 8, wherein the correction of the deviation is based on the 3-D geometry of the first surface of the component.

10. The process according to claim 9, wherein the step of generating a production program further comprises the step of developing and storing process parameters and at least one transformation matrix.

11. The process according to claim 9, wherein the holes are generated by at least one of electrochemical processing or erosion.

12. The process according to claim 8, further comprising the step of calculating or measuring the drilling depth of at least one hole.

13. The process according to claim 12, wherein the step of generating a production program further comprises the step of developing and storing process parameters and at least one transformation matrix.

14. The process according to claim 12, wherein the holes are generated by at least one of cutting, laser removal, electrochemical processing, or erosion.

15. The process according to claim 8, wherein the step of generating a production program further comprises developing and storing process parameters and at least one transformation matrix.

16. The process according to claim 8, wherein the holes are generated by at least one of laser removal or electrochemical processing.

17. The process according to claim 1, further comprising the step of calculating a drilling depth of at least one hole.

18. The process according to claim 17, wherein the step of generating a production program further comprises the step of developing and storing process parameters and at least one transformation matrix.

19. The process according to claim 17, wherein the holes are generated by at least one of laser removal or erosion.

20. The process according to claim 1, wherein the step of generating a production program further comprises the step of developing and storing process parameters and at least one transformation matrix.

21. The process according to claim 20, further comprising the step of using respective transformation of a set of sample data to produce one or more components having a similar 3-D geometry in parallel.

22. The process according to claim 20, wherein the production program comprises at least one of traversing paths, removal volumes and process parameters.

23. The process according to claim 1, wherein the holes are generated by at least one of cutting, laser removal, electrochemical processing, or erosion.

24. The process according to claim 1, comprising measuring a drilling depth during the process of producing a hole.

25. The process according to claim 1, wherein each hole comprises a new hole.

26. The process according to claim 1, wherein the component is a new part.

27. The process according to claim 1, wherein the data from the computer tomography and the data from the optical processes are transferred into the 3-D model using a six-point nest transfer.

28. A production arrangement for producing a plurality of holes in a component, the arrangement comprising the steps of:
- at least one processor connected to at least one device for developing a 3-D model of a 3-D geometry of the component using computer tomography before producing the plurality of holes in the component, wherein the 3-D model is improved by using optical measurement processes in addition to the computer tomography before producing the plurality of holes in the component;
- at least one device for automatically adapting each of the plurality of holes based on a nominal 3-D model of the component and the 3-D geometry of the component to form a plurality of adapted hole specifications, wherein:
  - the 3-D geometry of the component is determined by 3-D measurements made before producing the plurality of holes in the component;
  - the 3-D measurements are made when the component is clamped in a machine that produces the plurality of holes in the component;
  - each adapted hole specification takes into account respective tolerances when each individual component is clamped in the machine; and
  - the plurality of adapted hole specifications comprises at least one of a tilted hole center axis angle or a shifted position of a hole center axis on the exterior surface of the component; and
- at least one device for automatically generating production programs used for forming the plurality of holes in the component corresponding to the plurality of adapted hole specifications,
- wherein each hole extends from a first surface at the exterior of the component to a second surface at the interior of the component.

29. The production arrangement according to claim 28, wherein the 3-D geometry of the component is the actual geometry.

30. The production arrangement according to claim 28, wherein the component comprises a turbo engine.

31. The production arrangement according to claim 28, further comprising an automatic drilling tool connected to the processor.

32. The production arrangement according to claim 28, wherein the production arrangement is configured to reduce power before a shot through or break through into an interior space of the component occurs.

* * * * *